(12) United States Patent
Hadziristic

(10) Patent No.: US 10,491,093 B2
(45) Date of Patent: Nov. 26, 2019

(54) TUBULAR LINEAR INDUCTION MOTOR SUITABLE FOR TRANSPORTATION

(71) Applicant: Konstantin Hadziristic, Toronto (CA)

(72) Inventor: Konstantin Hadziristic, Toronto (CA)

(*) Notice: Subject to any disclaimer, the term of this patent is extended or adjusted under 35 U.S.C. 154(b) by 0 days.

(21) Appl. No.: 16/221,746

(22) Filed: Dec. 17, 2018

(65) Prior Publication Data

US 2019/0123629 A1    Apr. 25, 2019

(51) Int. Cl.
| | |
|---|---|
| H02K 41/025 | (2006.01) |
| H02K 1/02 | (2006.01) |
| B61B 13/08 | (2006.01) |
| H02K 3/12 | (2006.01) |

(52) U.S. Cl.
CPC ......... H02K 41/025 (2013.01); B61B 13/08 (2013.01); H02K 1/02 (2013.01); H02K 3/12 (2013.01)

(58) Field of Classification Search
CPC .......... H02K 41/025; H02K 1/02; H02K 3/12; B60L 13/00; B60L 13/06; B60L 13/006; B60L 13/04; B60L 13/08; B61B 13/00; B61B 13/08; B61B 13/10; B61B 13/12; B61B 5/00; B61B 5/025
USPC ..... 310/12.04, 12.07, 12.09, 12.11; 104/281, 104/282, 283, 284, 285, 286, 138.1, 104/138.2, 139
See application file for complete search history.

(56) References Cited

U.S. PATENT DOCUMENTS

| | | | | |
|---|---|---|---|---|
| 3,148,292 | A | * | 9/1964 | Bergslien et al. ... H02K 41/025 310/13 |
| 3,385,228 | A | * | 5/1968 | Kwangho ............ B60L 13/03 104/23.2 |
| 3,513,338 | A | * | 5/1970 | Polujadoff .......... B60L 5/005 104/289 |
| 3,531,666 | A | * | 9/1970 | Ford ................. H02K 41/025 160/331 |
| 3,768,417 | A | * | 10/1973 | Thornton ............ B60L 13/10 104/282 |
| 3,820,472 | A | * | 6/1974 | Schwarzler .......... B60L 13/03 104/294 |
| 3,895,585 | A | * | 7/1975 | Schwarzler ........ H02K 41/025 104/290 |
| 4,061,089 | A | | 12/1977 | Sawyer |
| 4,324,185 | A | | 4/1982 | Vinson |
| 4,512,258 | A | | 4/1985 | Matsukata |
| 5,146,853 | A | * | 9/1992 | Suppes ................ B60L 13/10 104/138.2 |
| 5,276,293 | A | | 1/1994 | Narumi et al. |
| 5,298,819 | A | | 3/1994 | Suganuma et al. |
| 5,365,131 | A | | 11/1994 | Naito et al. |
| 5,388,527 | A | | 2/1995 | Thornton et al. |
| 5,653,173 | A | | 8/1997 | Ficher |
| 5,831,353 | A | | 11/1998 | Bolding et al. |
| 6,130,490 | A | | 10/2000 | Lee |
| 6,354,224 | B1 | | 3/2002 | Devnani et al. |

(Continued)

*Primary Examiner* — Mang Tin Bik Lian
*Assistant Examiner* — Ahmed Elnakib

(57) ABSTRACT

The invention relates to an electrical linear induction motor which is adapted for tubular high speed transportation and constructed so that it contains an active tubular inductor (mover) made of ferromagnetic material carrying electrical windings in its slots and an outer passive inexpensive induct (stator) in shape of tube layered with conducting sheets. The mover can carry cargo inside its inner cavity, or one or more movers can be incorporated in a special vehicle movable inside the stator tube.

18 Claims, 10 Drawing Sheets

(56) References Cited

U.S. PATENT DOCUMENTS

| | | | |
|---|---|---|---|
| 6,374,746 B1 * | 4/2002 | Fiske | B61B 13/08 |
| | | | 104/138.1 |
| 6,418,857 B1 * | 7/2002 | Okano | B60L 13/04 |
| | | | 104/281 |
| 7,562,628 B2 | 7/2009 | Wamble, III et al. | |
| 7,752,736 B2 | 7/2010 | Pulford et al. | |
| 7,812,482 B2 | 10/2010 | Aso et al. | |
| 7,958,908 B2 | 6/2011 | Cho et al. | |
| 8,106,545 B2 | 12/2012 | Homma et al. | |
| 8,390,153 B2 | 3/2013 | Aso et al. | |
| 8,618,700 B2 | 12/2013 | Muramatsu et al. | |
| 8,783,192 B2 | 7/2014 | Smith | |
| 8,922,069 B2 | 12/2014 | Iwaki | |
| 9,209,662 B2 | 12/2015 | Hsieh | |
| 9,228,298 B2 | 1/2016 | Oster | |
| 9,379,599 B2 | 6/2016 | Tang et al. | |
| 9,479,040 B2 | 10/2016 | Schaffel et al. | |
| 9,511,959 B2 | 12/2016 | Bambrogan et al. | |
| 9,517,901 B2 | 12/2016 | Bambrogan et al. | |
| 9,525,329 B2 | 12/2016 | Satau et al. | |
| 9,604,798 B2 | 3/2017 | Bambrogan et al. | |
| 9,718,630 B2 | 8/2017 | Bambrogan et al. | |
| 9,739,229 B2 | 8/2017 | Hutchins et al. | |
| 9,764,648 B2 | 9/2017 | Finodeyev et al. | |
| 9,871,433 B2 | 1/2018 | Satou et al. | |
| 9,887,612 B1 | 2/2018 | Eghbal | |
| 9,935,536 B2 | 4/2018 | Rios-Quesada et al. | |
| 9,973,065 B2 | 5/2018 | McAleese et al. | |
| 9,997,985 B2 | 6/2018 | Prussmeier | |
| 10,000,892 B2 | 6/2018 | Oster | |
| 10,020,716 B2 | 7/2018 | Attmur | |
| 10,044,251 B2 | 8/2018 | Masuzawa et al. | |
| 10,050,507 B2 | 8/2018 | Hofstetter et al. | |
| 10,086,846 B2 | 10/2018 | Dalrymple | |
| 10,093,493 B2 | 10/2018 | Bambrogan et al. | |
| 10,102,954 B2 | 10/2018 | Waterstredt et al. | |
| 10,103,593 B2 | 10/2018 | Kano et al. | |
| 10,116,195 B2 | 10/2018 | Lu | |
| 2005/0006959 A1 | 1/2005 | Hoppe et al. | |
| 2016/0229297 A1 * | 8/2016 | Finodeyev | B60L 11/002 |
| 2017/0237329 A1 * | 8/2017 | Chen | H02K 11/215 |
| | | | 310/12.07 |
| 2019/0123629 A1 * | 4/2019 | Hadziristic | H02K 41/025 |

\* cited by examiner

TUBULAR LINEAR INDUCTION MOTOR SUITABLE FOR TRANSPORTATION

THE FIELD OF INVENTION

This invention relates to a distinctive configuration of a tubular linear induction motor where a short tubular active mover is positioned inside a long tubular passive stator. The disclosure is further directed to, by way of non-limiting example, transportation systems comprising such motors.

Under the Cooperative and International Patent Classification this invention belongs to H02K 41/00 group and the application of the invention belongs to B61B 13/00 group.

BACKGROUND OF THE INVENTION

It is common in industry to produce linear mechanical motion directly through electromagnetic forces developed by a variety of linear electric motors. Linear induction motors are the most common among them. The principles of linear induction motors are well known: a three-phase winding of inductor generates a traveling electromagnetic field which induces eddy currents in the conducting layer of the induct and their interaction produces thrust in a lengthwise direction.

Despite lower energy conversion efficiency and power factor, the ruggedness of linear induction motors promotes a multitude of motor topologies for various applications. Flat and tubular topologies are the two basic classes.

Various types of tubular linear induction motors (T-LIM) are known in the art. They are commonly treated as low-speed linear induction motors with low excursion; lower than 1.5 to 2 meters. There are many well-known actuators with short-path reciprocating movement of induct. They are predominantly configured as a simple solid passive shaft moving inside the active stator which carries AC powered electrical windings (inductor). The mover can be complemented by permanent magnets. They have found application in, among others, compressors, pumps, and valves.

Examples of T-LIM actuators can be found in: U.S. Pat. No. 10,102,954 to Waterstredt at al., U.S. Pat. No. 9,935,536 to Rios-Quesada at al., U.S. Pat. No. 9,887,612 to Eghbal at al., U.S. Pat. No. 9,871,433 to Satou at al., U.S. Pat. No. 9,739,229 to Hutchins at al., U.S. Pat. No. 9,525,329 to Satau at al., U.S. Pat. No. 9,209,662 to Hsieh at al., U.S. Pat. No. 8,922,069 to Iwaki at al., U.S. Pat. No. 8,618,700 to Muramatsu at al., U.S. Pat. No. 8,106,545 to Homma at al., U.S. Pat. No. 7,958,908 to Cho at al., and U.S. Pat. No. 5,831,353 to Bolding at al.

There is a variety of other applications of T-LIM where short and precise linear motions are required—for example two or three coordinates stepper motors. The application of these motors is limited to short linear movements in the machine industry where precise positioning is essential.

Examples of these types of T-LIM can be found in: U.S. patent application Ser. No. 10/882,095 to Hoppe at al., U.S. Pat. No. 10,116,195 to Lu at al., U.S. Pat. No. 10,103,593 to Kano at al., U.S. Pat. No. 10,050,507 to Hofstetter at al., U.S. Pat. No. 10,044,251 to Masuzawa at al., U.S. Pat. No. 10,020,716 to Atmur at al., U.S. Pat. No. 9,973,065 to McAleese at al., U.S. Pat. No. 9,479,040 to Schaffel at al., U.S. Pat. No. 9,379,599 to Tang at al., U.S. Pat. No. 8,390,153 to Aso at al., U.S. Pat. No. 7,812,482 to Aso at al., U.S. Pat. No. 7,752,736 to Pulford at al., U.S. Pat. No. 6,354,224 to Devnani at al., U.S. Pat. No. 6,130,490 to Lee at al., U.S. Pat. No. 5,365,131 to Naito at al., U.S. Pat. No. 5,298,819 to Suganuma at al., and U.S. Pat. No. 5,276,293 to Narumi at al.

The existing T-LIMs in the art are not suitable for higher speeds and long traveling ranges required in transportation field.

Recent development in tubular transportation domain makes possible and attractive an application of some kind of tubular motor, like a tubular linear induction motor, which is by its topology well suited for the purpose.

Examples of high speed tubular transportation patents: U.S. Pat. No. 10,093,493 to Bambrogan at al., U.S. Pat. No. 10,086,846 to Dalrymple at al., U.S. Pat. No. 9,997,985 to Prussmeier at al., U.S. Pat. No. 9,764,648 to Finodeyev at al., U.S. Pat. No. 9,718,630 to Bambrogan at al., U.S. Pat. No. 9,604,798 to Bambrogan at al., U.S. Pat. No. 9,517,901 to Bambrogan at al., U.S. Pat. No. 9,511,959 to Bambrogan at al., U.S. Pat. No. 8,783,192 to Smith at al., U.S. Pat. No. 7,562,628 to Wamble at al., U.S. Pat. No. 6,374,746 to Fiske at al., U.S. Pat. No. 5,653,173 to Ficher at al., U.S. Pat. No. 5,388,527 to Thornton at al., U.S. Pat. No. 4,512,258 to Matsukata at al., U.S. Pat. No. 4,324,185 to Vinson at al., and U.S. Pat. No. 4,061,089 to Sawyer at al.

SUMMARY OF THE INVENTION

This invention greatly overcomes the disadvantages of tubular linear induction motors by inverting their common configuration so that the mover is a short active inductor while the stator is a long passive and inexpensive tube enclosure. The three-phase winding of the inductor generates a traveling electromagnetic field which induces eddy currents in the conducting layer of tubular induct and their interaction produces thrust in a linear axial direction and in the same time suspension and guidance forces in radial direction.

The length of the stator, i.e. the length of the traveling pathway, is not limited. This opens a new field for tubular linear induction motor which is suitable for, among other things, tube transportation applications. The speed of the T-LIM can be controlled by off-board or onboard frequency converters/controllers in a very wide range. There is no theoretical limitation and ultrasonic speeds are possible provided that the air inside the tube is eliminated or its pressure significantly lowered.

The inductor (mover) is, consequently, shaped like a tube with a rectangular or circular cross-section which leaves a hollow inner space which is useful for cargo space. It can be accommodated for transport of goods, material, or people. In another embodiment, one or more movers can be incorporated in a special vehicle drivable inside the stator tube.

In another embodiment of tubular linear induction motor suitable for transportation, the inductor slots are created so that they form parallel circumferential rings wherein the top portion of each slot is positioned slightly ahead of the bottom portion in an axial direction so that slanted slots appear on both vertical sides of the mover. This permits a fraction of longitudinal force, which produces thrust, to be redirected in a vertical direction and so compensate for the mover's weight.

In yet another embodiment the tubular linear induction motor slots contain at least two independent windings fed from at least two control systems so that one predominantly generates thrust in a forward direction while the other produces predominantly normal forces for the suspension of inductor.

In another embodiment the ferromagnetic core of the inductor of the tubular linear induction motor contains Halbach array rings incorporated into the tips of teeth which will boost magnetic field and assist suspension of the inductor, especially at higher speeds.

BRIEF DESCRIPTION OF THE DRAWINGS

FIG. 7 present enlarged views of mover slots from drawings FIG. 5 and FIG. 6, wherein:

DETAILED DESCRIPTION

Figure 1A:
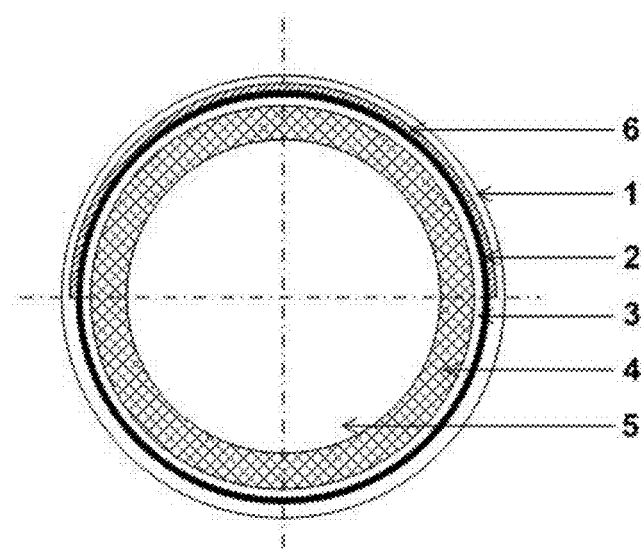
FIG. 1A presents a cross-sectional view of a circular T-LIM.
Figure 1B:
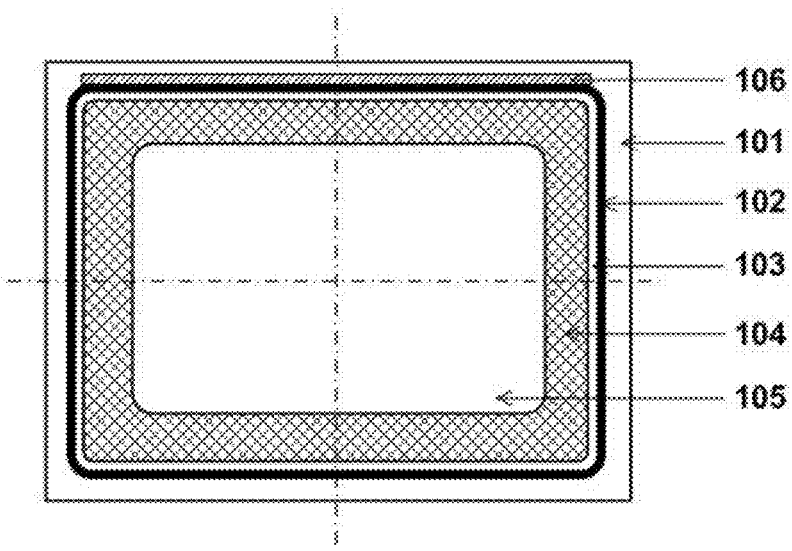
FIG. 1B presents a cross-sectional view of a rectangular T-LIM.

In the drawings FIG. 1A and FIG. 1B, which illustrate the cross-sections of the tubular linear induction motor suitable for transportation, two basic shapes are presented: a circular one in FIG. 1A and a rectangular cross-section in FIG. 1B.

Other embodiments are possible, like elliptical, triangular or polygonal, or any combination of these shapes, but they are not depicted.

The functionality and all features of T-LIM are identical for both presented cross-sections, therefore in further descriptions of the invention the preferred embodiment will be the cylindrical shape of inductor and induct of T-LIM and, where not stated, the circular shape will be assumed.

The tubular linear induction motor suitable for transportation consists of a long stator containing a non-magnetic outer tube 1 with a conducting layer 2 and of a short active mover presented by the sketched area 4. The outer shape of mover matches the inner shape of the stator tube while its dimensions are slightly smaller so that an air gap 3 is created between them.

Equivalently, the rectangular shaped tubular linear induction motor for transportation consists of a long stator containing a non-magnetic outer tube 101 with a conducting layer 102 and of a short active mover presented by sketched area 104. The outer shape of the mover matches the inner shape of the stator tube while its dimensions are slightly smaller so that an air gap 103 is created between them.

The air gap must be big enough to allow unobstructed movement of the mover. This motor permits the size of the air gap to be extremely small due to self-centering normal forces acting on the mover. The greater the speed of mover, the stronger centering forces will be produced.

The significant characteristic of this motor, which makes it suitable for transportation purposes, is the open space inside the tubular mover which is useful cargo space 5 or 105.

In the upper portion of the non-magnetic stator tube 1 or 101 is incorporated a steel segment 6 in cylindrical T-LIM or a steel segment 106 in rectangular T-LIM. These segments are as long as the stator length is, but their exact width and thickness must be optimized so that the attraction suspension force generated in between them and the mover can compensate the weight of the mover or the appropriate vehicle.

The stator conducting layer can have multiple functions: to be utilized as induct and as power distributing system. It can be variably shaped along the guideway to help suspension and guidance of mover. Integration of multiple electrical functions into a single stator structure is an effective means for reducing motor size and cost, and for increasing the overall efficiency of a transportation system.

Stator (Passive Induct):

The tubular enclosure, or stator, has the role of a passive induct and a guideway. It can be installed on overhead pylons, or underground, laid on the ocean floor, installed on any appropriate mechanical structure, or any combinations of above. The guideway can contain single or multiple tubes in parallel arrangement. In any configuration of tube guideways the mover has to be designed for forward and backward motions. The only difference is the frequency of vehicle trips from the start to the destination: in a single-tube arrangement, only one vehicle can travel in each direction at a time, while in multiple guideways multiple vehicles can travel in succession.

Figure 2A:
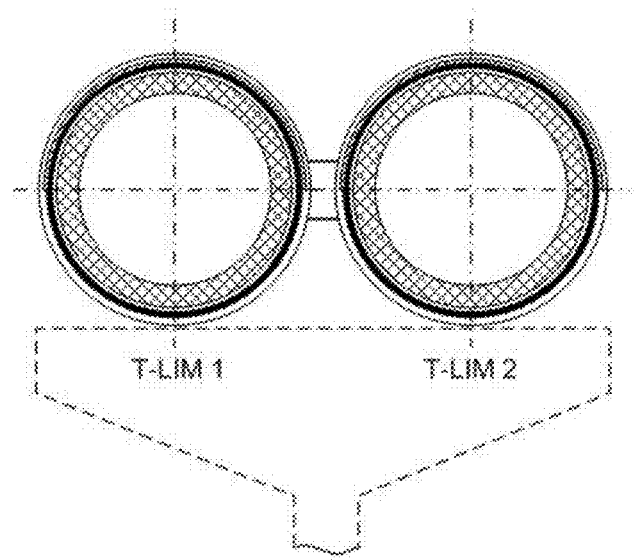
FIG. 2A is a cross-sectional view of a circular multi-tube guideway.
Figure 2B:
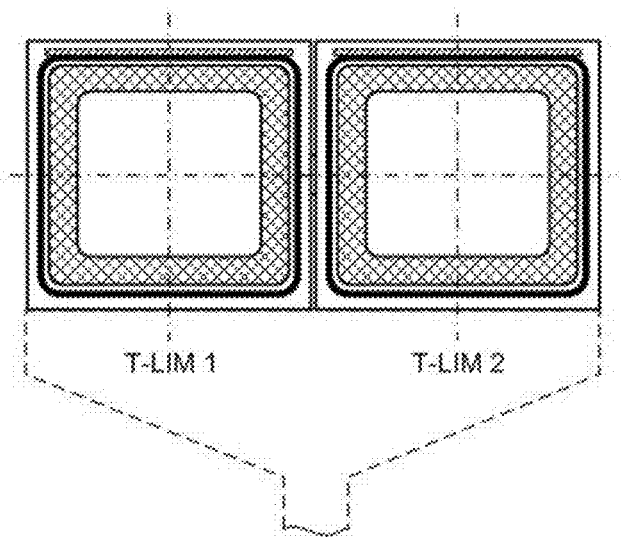
FIG. 2B is a cross-sectional view of a rectangular multi-tube guideway.

FIG. 2 present some possible multi-tube guideway topologies. Two parallel tubes is a preferred embodiment which has the said advantage of multiple simultaneous vehicles. FIG. 2A presents the circular tubes embodiment while FIG. 2B depicts the rectangular ones.

The outer tube of the stator structure can be made of concrete, plastic composites, carbon fiber, or any other construction non-magnetic material. For structural rigidity of the stator, the steel armature and other still construction elements can be utilized only if they will not impede the suspension of the mover by affecting the normal forces developed in between the induct and inductor.

The power supply of the inductor may be resolved by means of on-board batteries (with fast recharging in stations), a wireless microwave transmission system, or a system of sliding contacts which will obtain power through the conducting bars conveniently insulated inside the outer stator tube, or any combination of these methods.

In the case of the power supply of the inductor through a system of sliding contacts collecting power from the conducting bars layered inside the stator tube, these bars of multi-functional induct have to be insulated to the appropriate voltage level and be able to distribute electrical energy through the whole length of the guideway. In the case of an off-board control system, a three-phase system supply is needed, while in case of onboard control converters and variable frequency drives (VFD) the supply can be either DC or one or poly-phase AC system.

Depending on the length of transportation path the stator tube is segmented longitudinally for construction purposes. Perpendicular segmentation depends on the function assigned to the T-LIM stator in various topologies:

In the preferred embodiment, without outer power supply through stator conductors (FIG. 1A), the conducting layer 2 is fused to the continuous outer tube 1. In this case the power supply can be obtained by means of on-board batteries (with fast recharging in stations), or a microwave system.

In another embodiment, without outer power supply through stator conductors (FIG. 1B), the conducting layer 102 is fused to the continuous outer rectangular tube 101. In this case the power supply can be obtained by means of on-board batteries (with fast recharging in stations), or a microwave system.

Figure 3A:
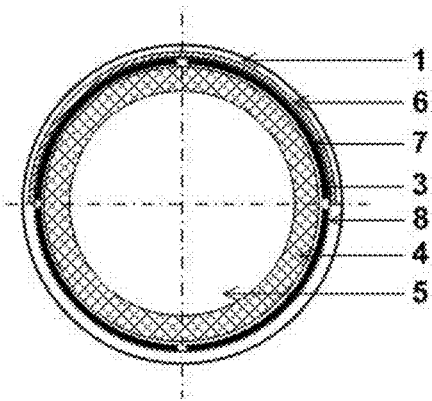
FIG. 3A presents cross-sectional view of a circular stator which consists of a non-magnetic tube, steel segment, separating insulation and four conducting tubular segments.
Figure 3B:
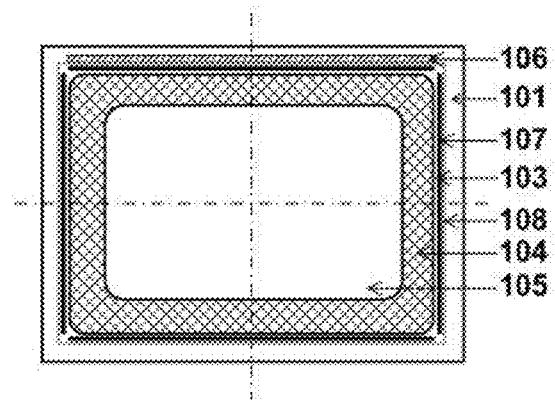
FIG. 3B presents a cross-sectional view of a rectangular stator which consists of a non-magnetic rectangular tube, steel segment, separating insulation and four conducting plates.

In other embodiments (FIG. 3A and FIG. 3B), when power distribution through stator is required, diversely shaped and insulated copper (or aluminium) segments are utilized. Drawing FIG. 3A presents the circular stator which consists of continuous outer tube 1, separating insulation 8 and four conducting tubular segments 7. Drawing FIG. 3B presents the rectangular stator which consists of continuous outer tube 101, separating insulation 108 and four conducting plates 107.

Figure 3C:
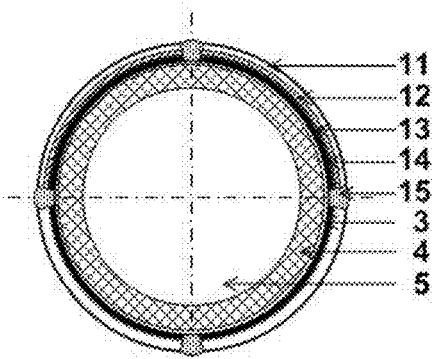
FIG. 3C presents a cross-sectional view of a circular stator which contains four blocks consisting of non-magnetic tube segments, steel segment, and conducting tubular segments fused together and separated by four insulation blocks.
Figure 3D:
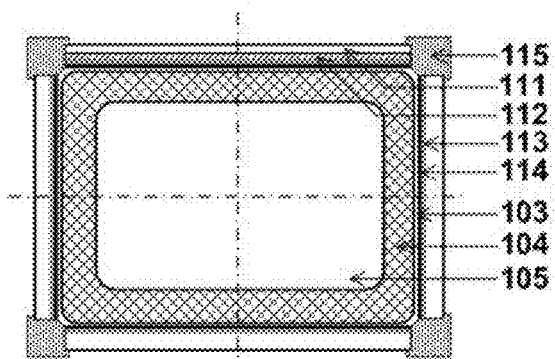
FIG. 3D presents a cross-sectional view of a rectangular stator which contains four blocks consisting of non-magnetic plates, a steel upper plate, and conducting plates fused together and separated by four insulation blocks.

In yet another embodiment (FIG. 3C and FIG. 3D), when power distribution through the stator is performed in a different way, diversely shaped and separated copper (or aluminium) as well as non-magnetic segments are utilized. Drawing FIG. 3C presents the circular stator containing four blocks consisting of four conducting segments 14 fused to four non-magnetic outer tube segments 11 through an insulation layer 13. The upper two blocks also contain steel tubular segments 12. The blocks are separated by four solid insulation wedges 15. Drawing FIG. 3D presents the rectangular stator containing four blocks consisting of four conducting segments 114 fused to four non-magnetic outer tube segments 111 through an insulation layer 113. The upper block also contain steel segment 112. The blocks are separated by four solid insulation wedges 115.

In all of the embodiments mentioned above, the adequate sealing compounds or other techniques have to be applied in between the stator perpendicular and longitudinal segments in order to facilitate the air under-pressurization or vacuumization of the stator tube assembly.

Mover (Active Inductor):

The mover 4, in the preferred embodiment of the tubular linear induction motor suitable for transportation (FIG. 1A), matches the inner shape of stator tube 1 and is dimensioned so that it forms a very small air gap 3 in between its outer diameter and the conducting layer of stator 2. In the stator embodiment on FIG. 3A the gap is the clearance between the outer mover diameter and conductive segments 7. In the stator embodiment on FIG. 3C the gap is the clearance between the outer mover diameter and conductive layer 13 of four separate blocks. In the stator embodiment on FIG. 3B the gap is the clearance between the outer mover dimension and conductive segments 107. In the stator embodiment on FIG. 3D the gap is the clearance between the outer mover dimension and conductive layer 114 of four separate blocks.

The air gap size of the tubular linear induction motor suitable for transportation will be dictated by the desirable radius of the loops of the guideway. The magnitude of curvatures will also influence the construction and size of the vehicle, the length of the tubular linear induction motor, and the number of propulsion motors in some embodiments.

The gap dimension will also be influenced by the flow of the air in the tubular system and cooling of the tubular linear induction motor suitable for transportation. In case of an under-pressurized tubular system, the remaining air flow will require a smaller air gap. To better overcome the Kantrowitz limit, a certain number of openings can be left in the magnetic core of the mover in a lengthwise direction. The air flow created can aid the cooling of the electric coils of the mover or movers.

The mover's cylindrical body can be cast of powdered soft magnetic material or made of laminated steel. The composite sintered material is preferred over laminated electric steel due to its known 3D properties, smaller weight and structural strength, which are essential requirements of ultra-fast transport.

Figure 4:
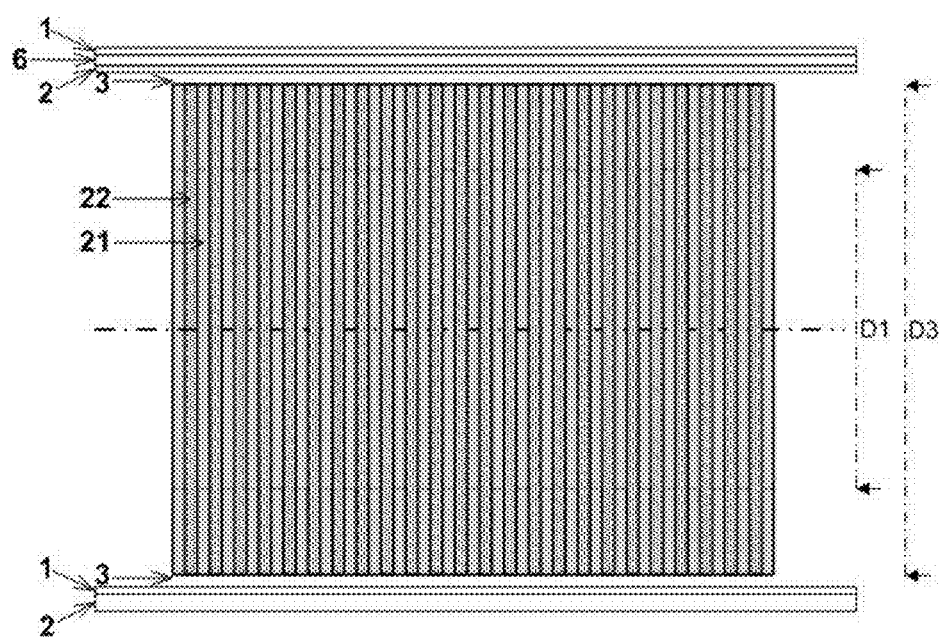
FIG. 4 illustrates a perspective view of the mover of a circular T-LIM.
Figure 5:
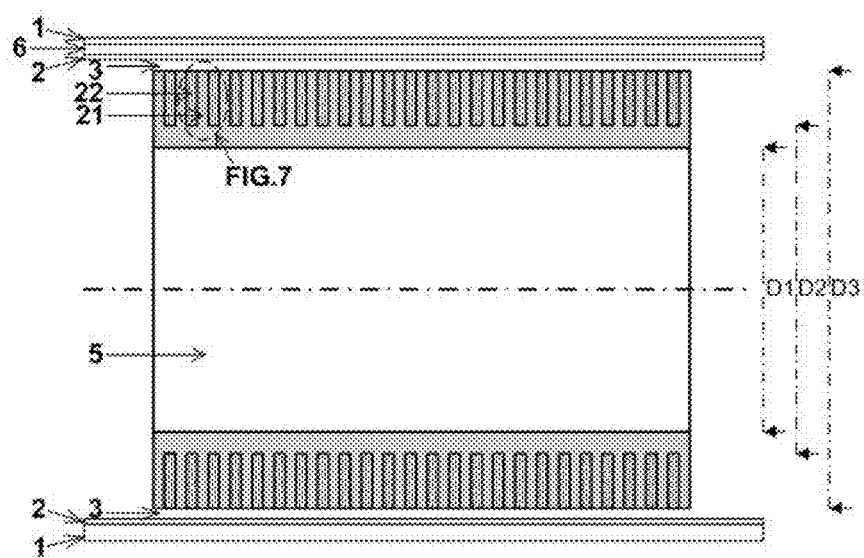
FIG. 5 depicts a lengthwise cross-sectional view of the mover of a circular T-LIM.
Figure 6:
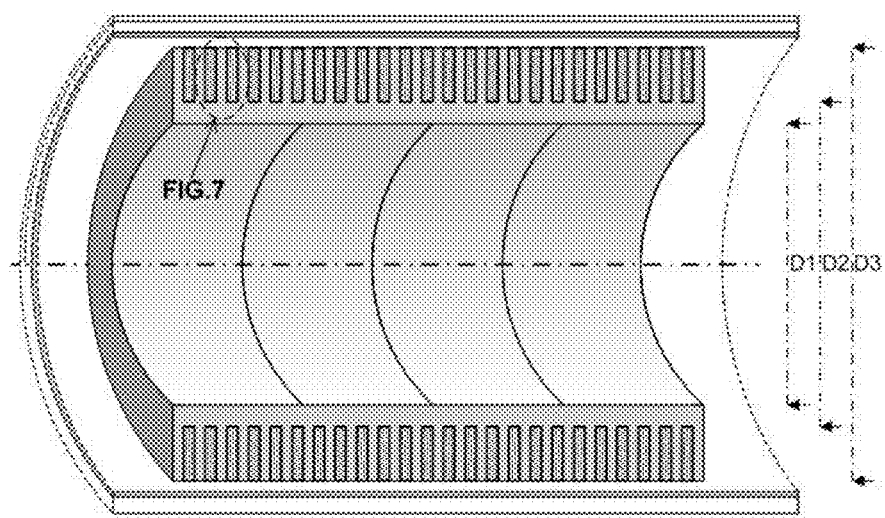
FIG. 6 illustrates a cut-away view of the mover of a circular T-LIM.

An exemplary embodiment of tubular mover with 24 slots is shown in FIGS. 4, 5 and 6. FIG. 4 presents a mover side view; FIG. 5 depicts its lengthwise cross section while FIG. 6 illustrates its cut-away view. The outer diameter of the mover's body is marked by D3 while its inner diameter is D1. The diameter D1 presents the interior cargo space of the motor. The difference in between D3 and D1 presents the thickness of the magnetic circuit of the mover and its size will depend on electromagnetical parameters of the overall tubular linear induction motor as well as on structural requirements of mover itself. The difference in between D3 and D2 presents the depth of slots in the magnetic body of the mover. The length of the mover depends on number and size of slots 22 and teeth 21 to be found in between them.

The plurality of slots 22 for the accommodation of circumferential electrical coils are cast (molded) or machine grooved concentrically in the ferromagnetic body of mover. The arrangement of slots on the outer surface of mover's body can be performed so that desired annular teeth 21 can be created in between them and at both ends of mover. The slots' geometry depends on performance characteristics required from the motor. The illustrated slots 22 are open slots but with careful casting technique these slots can be partially closed at the airgap side to improve the Carter factor and overall performance of T-LIM.

Dimensioning of electrical and magnetic circuits of tubular motor will follow well-known design processes, calculation and optimization of other types of linear induction motors. Besides the propulsion force this motor generates very significant radial or normal forces. By nature of its configuration, T-LIM produces active centering forces which can be utilized to significantly assist mover suspension and guidance systems at most operational speeds. At slow speeds and low frequencies the inductor will develop attractive forces in between itself and upper steel sections 6, which will assist the suspension, but after its acceleration phase the repulsion in between mover and stator will overcome, and the higher the speed, the better the centering of T-LIM mover will be. These thrust/suspension characteristics are well-studied in classical linear induction motors.

As previously stated, the power supply of the inductor may be resolved by means of powerful on-board batteries with fast recharging in stations, wireless microwave transmitter/receiver system or system of sliding contacts. The optimal solution will be most probably a combination of all three methods. On-board batteries are necessary for safety purposes, for maintenance of interior climate conditions in application of T-LIM for passengers transport in the case of under-pressured tubular system. The recuperation of electrical energy will also employ batteries to store the electrical energy produced by recuperative breaking during slowing down and stopping the T-LIM. These techniques are well-developed for other electrical induction motors.

Multiple electrical windings are of a concentrated winding type, ring-shaped, and placed in the slots whose enlarged views are presented in FIG. 7. For clarity, only two slots and three teeth are presented in details and it is assumed that the rest of them are identical.

Figure 7A:
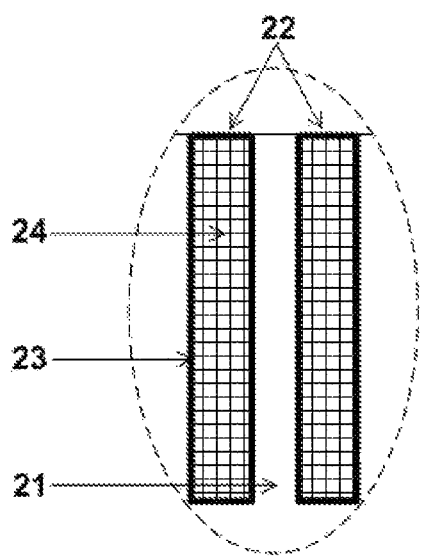
FIG. 7A illustrates single layer electrical winding and simple magnetic teeth.
Figure 7B:
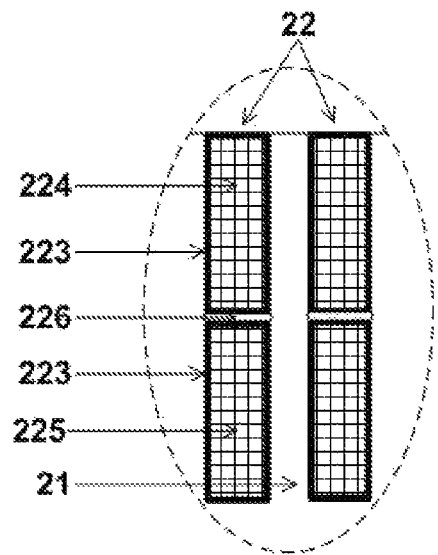
FIG. 7B illustrates double layer electrical winding and simple magnetic teeth.
Figure 7C:
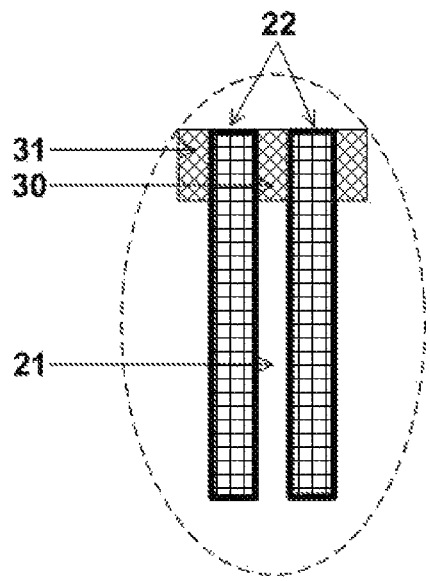
FIG. 7C illustrates single layer electrical winding and magnetic teeth with Halbach array tips.
Figure 7D:
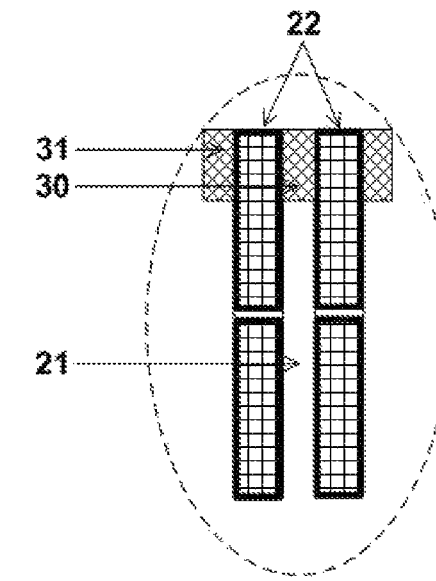
FIG. 7D illustrates double layer electrical winding and magnetic teeth with Halbach array tips.

In some embodiments the electrical windings can be arranged in a single layer like in FIG. 7A and FIG. 7C or in another embodiment in a double layer like in FIG. 7B and FIG. 7D.

Due to the three-phase AC power supply, which is needed to produce traveling magnetic field of the inductor, the number of slots is a multiple of three while the total number of slots will depend on desired number of slots per phase and number of poles of the motor.

Electrical windings are circular shaped full coils with cross section 24 as on FIG. 7A, wound into slots 22 and insulated from teeth 21 by insulation layer 23.

The double layer of electrical windings doesn't have the purpose of winding distribution as in some other linear motors. The two coils 224 and 225 illustrated on FIG. 7B are independent electrical windings, physically separated by insulation layer 226 so that they can be fed from two independent power sources. A few possibilities are:

- In one embodiment they are fed independently from VFD so that layer 224 produces predominantly the thrust of the tubular motor and the layer 225 produces predominantly the suspension forces.
- In another embodiment they are fed dependently from VFD so that both layer 224 and the layer 225 produce thrust and suspension forces during different phases of traveling.

Figure 8:
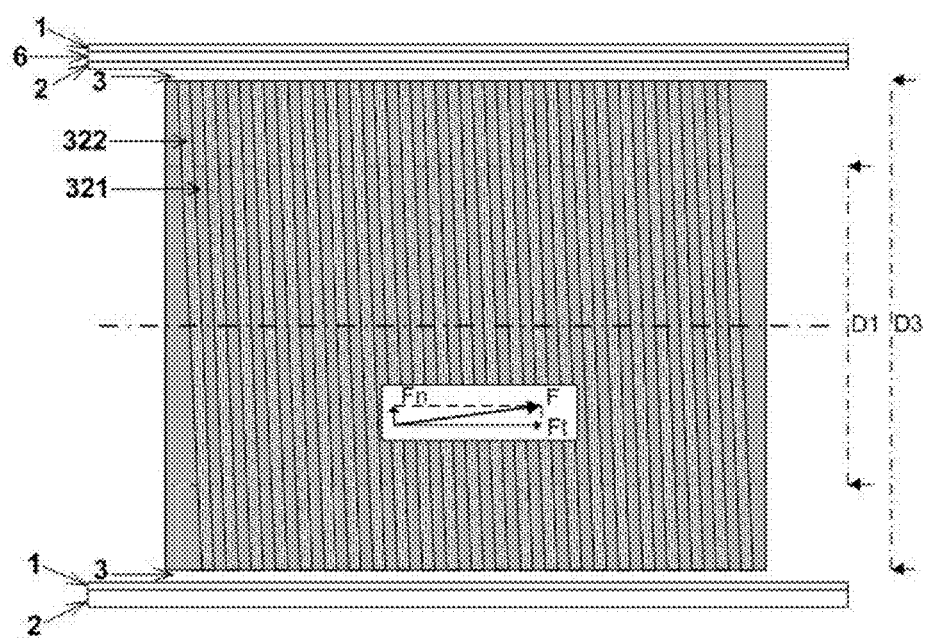
FIG. 8 illustrates a perspective view of mover of circular T-LIM with slanted slots.
Figure 9:
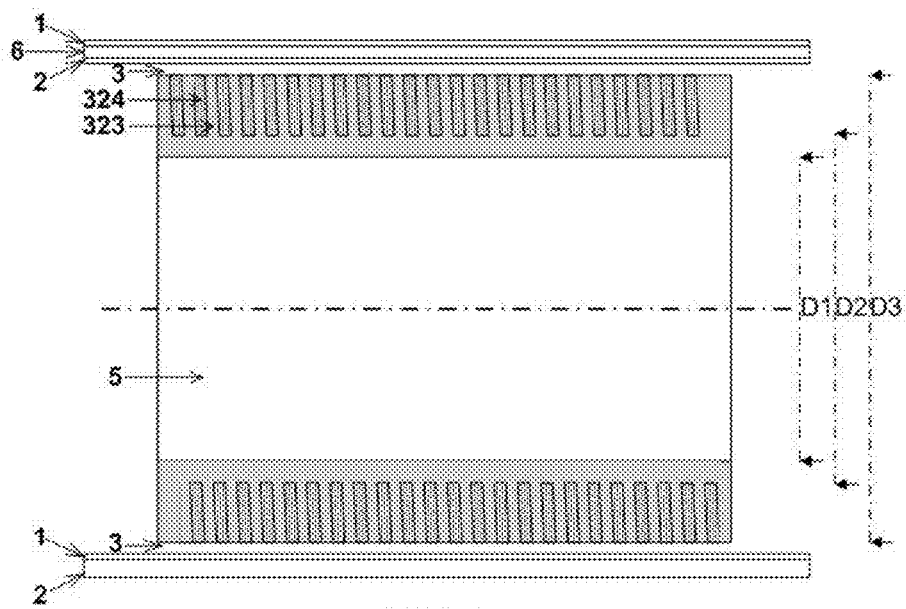
FIG. 9 depicts a lengthwise cross-sectional view of mover of circular T-LIM with slanted slots.

For suspension improvement, still another embodiment is presented on FIG. 8 and FIG. 9. The side view FIG. 8 of the mover of tubular linear induction motor with slanted slots 322 which are grooved so that they form slanted teeth 321 in a ferromagnetic body. This forms distinctly spaced electrical coils of the inductor which generate the thrust force F under a certain angle in relation to the axis, as seen on the inset of FIG. 8. This force has two components: the much bigger one producing longitudinal thrust force Ft while the vertical lift force Fn will be directed toward the top of the coil and so the mover. That way one desired portion of the thrust force will be redirected to suspension of mover and can compensate mover's or vehicle's weight. FIG. 9 depicts a lengthwise cross-sectional view of mover of circular T-LIM with slanted slots 324 and slanted teeth 323.

For suspension improvement, still another embodiment is presented on FIG. 7C and FIG. 7D. The T-LIM's ferromagnetic core of inductor contains Halbach rings 30 incorporated into the tips of teeth 21 and Halbach rings 31 incorporated into the edges of ferromagnetic body. The size and strength of these rings has to be optimized in accordance with other applied suspension methods. Halbach array is built of sectional magnets which are magnetized so that the strong field of the array is on the outer side of the mover's teeth. The strong magnetic field of the array points though the airgap toward the stator. The Halbach array's longitudinal movement will induce eddy currents in induct and so produce repulsive force in radial direction which will assist suspension and guidance of the inductor, especially at higher speeds. In still another embodiment, cylindrical Halbach array rings can be built into some of the mover's teeth or concentrated into two bigger rings 31 at the edges of T-LIM.

The best application of the invention will be in fast tubular transportation. In some applications the mover will be implemented in a transportation vehicle whose overall construction can contribute to its structural strength.

Figure 10A:
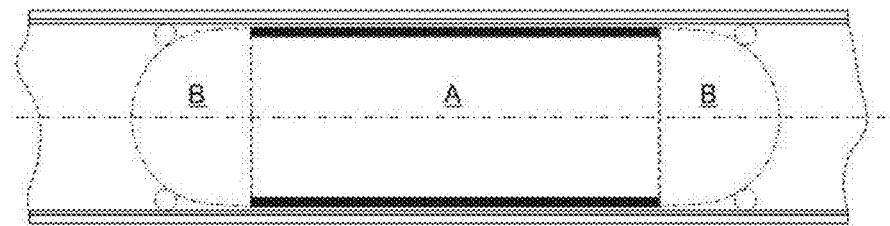
FIG. 10A is an outline of a transport vehicle containing one T-LIM mover.

The vehicle can be made of light, hard insulation material and can be designed so that it occupies the interior of single T-LIM mover or one vehicle or capsule can incorporate two or more movers. FIG. 10 depict two exemplary vehicle configurations:

On FIG. 10A is presented an outline of a transport vehicle consisting of T-LIM mover on outer edge of it while the useful space A for seats or cargo occupies its interior. The room B for power converters and power sliding contacts is on the front or back or both compartments. The overall diameter of tube guideway and its curvature will limit the length of the vehicle.

Figure 10B:
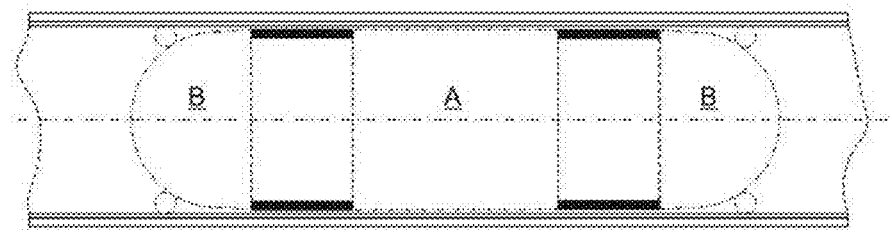
FIG. 10B is an outline of a transport vehicle containing two T-LIM movers.

Drawing FIG. 10B presents an outline of vehicle with two T-LIMs. The presented shape is circular but rectangular is also feasible. Two short T-LIMs carry longer vehicle which can accommodate control and power systems in compartments B, aside of the useful volume A. The vehicle can be made of flexible material or some other construction (like extended buses or street cars) may allow for sharp curvatures or loops on the guideway route.

Retractable wheels have to be implemented in tubular transport vehicles for safety purpose like for emergency stops. In yet another application of T-LIM these wheels can be utilized for stationary stop and start-up speeds of vehicle while the full acceleration and cruising speed phases, which cover more than 90% of total travel distance, will be levitated electromagnetically. In yet another application the stations and adjacent sections of guideway can carry Halbach array cylinders built into stator tubes so that they produce stationary permanent magnet levitation/suspension at zero or very low speeds.

In another embodiment, the motor can be utilized for vertical linear transport. As will be apparent to persons skilled in the art, the inductor of the induction motor in this invention is the member which is active i.e. which produces a magnetic field and is a moving member, also known as 'a mover'. The labels 'inductor' and 'mover' are utilized interchangeably in this specification and do not present structural alternatives. Similarly, the induct of the induction motor in this invention is the member which is passive, i.e. in which the magnetic field induces eddy currents and is a stationary member, also known as 'a stator'. The labels 'induct' and 'stator' are utilized interchangeably in this specification and do not present structural alternatives. As will be apparent to persons skilled in the art, various modifications and adaptations of the above described apparatus are possible without departure from the spirit and the scope of the invention, the scope of which is defined in the appended claims.

The embodiments of the invention in which an exclusive property or privilege is claimed and defined as follows:

1. A tubular linear induction motor suitable for transportation comprising first and second members, one of said members being an active tubular mover and the second member being a passive tubular stator;
   said stator member being an elongated circular cross-sectional tube made of non-magnetic material comprising:
      a circular cross-sectional layer of electrically conducting material attached to the interior and extending lengthwise throughout said stator, and
      a concave segment of ferromagnetic material fixed to an upper inner side of said stator and extending lengthwise throughout said stator;
   said stator being longer than said mover and having a passageway extending throughout said stator,
   said mover being disposed within said passageway for longitudinal movement along its length and having cross section defined to allow a sufficient air gap between said members,
   said mover member being a circular tube made of ferromagnetic material comprising:
      a plurality of parallel slots and teeth being positioned on a surface of said mover and extending around a periphery of said mover, each slot having an annular shape,
      a plurality of single layered electrical windings distributed in said annular slots, each winding forming an annular coil,
      a hollow interior extending throughout and forming an inner cargo compartment which can be accommodated for transport of material or passengers,
      a means of power supply of said active mover carried in said cargo compartment.

2. A tubular linear induction motor suitable for transportation as defined in claim 1, wherein said circular cross-sectional layer of electrically conducting material attached to the interior and extending lengthwise throughout said stator is divided into at least two sections and can be energized so that the power supply of said mover is realized by means of a plurality of sliding contacts incorporated into said mover's body, each contact collecting energy from one of said conducting layer sections of said stator.

3. A tubular linear induction motor suitable for transportation as defined in claim 2, wherein an insulation layer is incorporated in between said sections of electrically conducting layer and the said circular cross-sectional tube of said stator.

4. A tubular linear induction motor suitable for transportation as defined in claim 3, wherein said circular cross-sectional tube of said stator is divided into at least two sections, each section of non-magnetic tube fused with said conducting layer section and an insulation layer in between, forming at least two blocks, which are separated by insulation wedges extending lengthwise throughout said stator.

5. A tubular linear induction motor suitable for transportation as defined in claim 1, wherein a plurality of double layered electrical windings is distributed in said annular slots of said mover, each layer of double winding forming an annular coil.

6. A tubular linear induction motor suitable for transportation as defined in claim 1, wherein a plurality of cylindrical Halbach array rings are built into at least one of said mover's teeth.

7. A tubular linear induction motor suitable for transportation as defined in claim 1, wherein two cylindrical Halbach array rings are built into said mover's both ends.

8. A tubular linear induction motor suitable for transportation as defined in claim 1, wherein a plurality of said mover members are being incorporated into a structure of a vehicle and being disposed within said passageway for longitudinal movement along said stator.

9. A tubular linear induction motor suitable for transportation as defined in claim 1, wherein said mover member comprising:
   a plurality of parallel slanted slots and slanted teeth being positioned on the surface of said mover and extending around the periphery of said mover, each slot having an elliptical shape,
   a plurality of single layered electrical windings distributed in said slanted slots, each winding forming an elliptical coil.

10. A tubular linear induction motor suitable for transportation comprising first and second members, one of said members being an active tubular mover and the second member being a passive tubular stator;
    said stator member being an elongated rectangular cross-sectional tube made of non-magnetic material comprising:
       a rectangular cross-sectional layer of electrically conducting material attached to the interior and extending lengthwise throughout said stator, and
       a straight segment of ferromagnetic material fixed to an upper inner side of said stator and extending lengthwise throughout said stator;
    said stator member being longer than said mover and having a passageway extending throughout said stator,
    said mover being disposed within said passageway for longitudinal movement along its length and having cross section defined to allow a sufficient air gap between said members,
    said mover member being a rectangular tube made of ferromagnetic material comprising:
       a plurality of parallel slots and teeth being positioned on a surface of said mover and extending around a periphery of said mover, each slot having a rectangular shape,
       a plurality of single layered electrical windings distributed in said annular slots, each winding forming a rectangular coil,
       a hollow interior extending throughout and forming an inner cargo compartment which can be accommodated for transport of material or passengers,
       a means of power supply of said active mover carried in said cargo compartment.

11. A tubular linear induction motor suitable for transportation as defined in claim 10, wherein said rectangular cross-sectional layer of electrically conducting material attached to the interior and extending lengthwise throughout said stator is divided into at least two sections and can be energized so that the power supply of said mover is realized by means of a plurality of sliding contacts incorporated into said mover's body, each contact collecting energy from one of said conducting layer sections of said stator.

12. A tubular linear induction motor suitable for transportation as defined in claim 11, wherein an insulation layer is incorporated in between said sections of electrically conducting layer and the said rectangular cross-sectional tube of said stator.

13. A tubular linear induction motor suitable for transportation as defined in claim 12, wherein said rectangular cross-sectional tube of said stator is divided into at least two sections, each section of non-magnetic tube fused with said conducting layer section and an insulation layer in between, forming at least two blocks, which are separated by insulation wedges extending lengthwise throughout said stator.

14. A tubular linear induction motor suitable for transportation as defined in claim 10, wherein a plurality of double layered electrical windings is distributed in said rectangular slots of said mover, each layer of double winding forming a rectangular coil.

15. A tubular linear induction motor suitable for transportation as defined in claim 10, wherein a plurality of rectangular Halbach array rings are built into at least one of said mover's teeth.

16. A tubular linear induction motor suitable for transportation as defined in claim 10, wherein two rectangular Halbach array rings are built into said mover's both ends.

17. A tubular linear induction motor suitable for transportation as defined in claim 10, wherein a plurality of said mover members are being incorporated into a structure of a vehicle and being disposed within said passageway for longitudinal movement along said stator.

18. A tubular linear induction motor suitable for transportation as defined in claim 10, wherein said mover member comprising:
a plurality of parallel slanted slots and slanted teeth being positioned on the surface of said mover and extending around the periphery of said mover, each slot having top and bottom horizontal portions and slanted portions on both sides of said rectangular mover,
a plurality of single layered electrical windings distributed in said slanted slots, each winding forming a slanted rectangular coil with horizontal top and bottom portions.

* * * * *